United States Patent [19]

Stutz

[11] 4,294,545
[45] Oct. 13, 1981

[54] DEVICE FOR CONTINUOUSLY MEASURING A TRANSVERSE DIMENSION OF A THREAD-LIKE STRUCTURE

[75] Inventor: Hansruedi Stutz, Dietlikon, Switzerland

[73] Assignee: Gebrüder Loepfe AG, Zurich, Switzerland

[21] Appl. No.: 101,879

[22] Filed: Dec. 10, 1979

[30] Foreign Application Priority Data

Dec. 18, 1978 [CH] Switzerland .................. 12824/78

[51] Int. Cl.³ .................. G01B 11/10; G01B 11/02
[52] U.S. Cl. .................. 356/386; 250/559; 356/429
[58] Field of Search .................. 356/384-387, 356/307, 372, 379, 429-431, 434; 250/559-560, 562-563, 578, 571-572; 358/107, 106, 113

[56] References Cited

U.S. PATENT DOCUMENTS

| 3,258,529 | 6/1966 | Parrish et al. ............ 358/113 |
| 3,987,244 | 10/1976 | Messman ................ 358/106 |
| 4,046,536 | 9/1977 | Smithgall ............... 356/385 |
| 4,173,788 | 11/1979 | Laliotis ................ 250/560 |
| 4,207,593 | 6/1980 | Deutsch et al. .......... 250/562 |

Primary Examiner—William H. Punter
Attorney, Agent, or Firm—Werner W. Kleeman

[57] ABSTRACT

A device for measuring the instantaneous value of the diameter or other transverse dimension of a traveling yarn comprises a linear array of photoelectric sensors and an electronic measuring device for scanning the sensors and digitally processing the electrical scanning signals in serial form. The ground signal indicative of the condition "no yarn present" is eliminated by means for intermediately storing the scanning signal, means for delaying the latter and storing the delayed signal, and subtracting the stored undelayed signal from the delayed signal such as to eliminate the ground signal and to furnish a pure yarn signal representative of the yarn diameter.

5 Claims, 3 Drawing Figures

DEVICE FOR CONTINUOUSLY MEASURING A TRANSVERSE DIMENSION OF A THREAD-LIKE STRUCTURE

CROSS REFERENCE TO RELATED CASE

This application is related to the commonly assigned copending U.S. application Ser. No. 097,314, filed Nov. 26, 1979.

BACKGROUND OF THE INVENTION

The present invention relates to a novel device for the continuous measurement of a transverse dimension of a traveling yarn-like structure, such as a yarn traveling on a textile machine, with the aid of a linear array of photosensitive or optoelectrical sensors. The novel measuring device is of importance, among others, for the detection and elimination of yarn faults by means of electronic yarn clearers.

Devices for recording various variable processes with the aid of linear or two-dimensional arrays of optoelectrical sensors are known. In German Pat. No. 1,216,589 there is described an arrangement for the automatic detection of characters passing at a constant speed by a sensing zone, where the information content appearing in the sensing zone is supplied to a matrix memory. The characters are sensed by a double row of photosensors, where the sensors of one row are staggered to the ones of the other row, in order to ensure uninterrupted sensing. The binary signals furnished by the sensors in any sensing cycle are processed in parallel. Any character is read in five consecutive sensing cycles in the direction of reading, and the binary signals gained in one cycle are stored in one of five storage rows. Each storage row comprises a multiplicity of storage units the number of which is greater than the number of sensors.

Such sensing with the aid of photosensitive sensors has up to now not yet gained admission to the technology of measuring running yarns, threads, slivers etc. though it implies certain advantages in the textile industries. With the conventional optoelectrical measuring devices which are used e.g. in optoelectronic yarn clearers, the continuous detection of the transverse dimension of the yarn causes serious difficulties since the measuring signals furnished by the sensor always comprise the ground signal brought about by the empty measuring area, combined with the relatively small yarn signal which represents the transverse dimension. Thus, any changes of the ground signal due to ageing of the structural parts and in particular due to dirt in the optics also affect the yarn signal. Now it is difficult or even impossible to continuously compensate or eliminate those undesired changes during the working process and in particular when clearing yarn in a winding plant. Above all, unsymmetrical dirt distribution in the optics is a problem which up to now has not been dealt with, much less solved.

SUMMARY OF THE INVENTION

It is the primary object of the invention to provide a novel optoelectrical yarn measuring device based on digital yarn sensing.

It is a further object of the invention to procure a yarn measuring device which provides for elimination of the ground signal and the undesired changes thereof which affect the measurement of the yarn transverse dimension.

Another more specific object of the invention is the suppression of the influence of unequal dirt distribution in the measuring area of an optoelectrical yarn measuring or sensing device.

In the following context, the term transverse dimension is meant to comprise the diameter, cross-sectional area or generally the variable measured by the sensing procedure.

With the normal working of a textile machine, in particular an automatic yarn winding machine, there occur, e.g. when the supply bobbin is changed or after yarn severing events which eliminate yarn faults, stoppages during which no yarn is present in the measuring area. The inventive measuring device advantageously makes use of those stoppage intervals for detecting and storing the ground signal associated with the empty measuring area and thus avoids interruption of the normal run of the winding process. Then, when the winding device has started again with yarn present in the measuring area, the ground signal combined with the yarn signal is measured, and by subtracting the stored ground signal from the combined signal there results the pure yarn signal which in the further course of the winding process follows all the changes of the yarn diameter.

In the following description of the invention and claims, the serial processing of digital signals furnished by an array of photosensors is illustrated. The term one-bit signal refers to the signals produced by a single sensor, the term digital to a signal representing the total of the one-bit signals.

BRIEF DESCRIPTION OF THE DRAWINGS

The invention will be better understood and objects other than those set forth above will be apparent upon consideration of the following detailed description thereof which makes reference to the annexed drawings wherein.

DETAILED DESCRIPTION OF THE INVENTION

Figure 1:
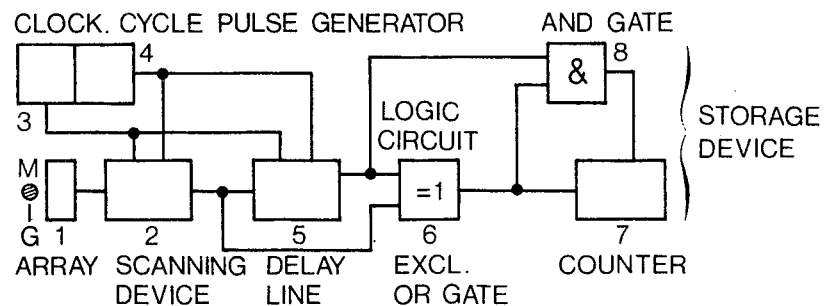
FIG. 1 shows a first embodiment of the inventive measuring device in block schematic.

With reference to FIG. 1, the yarn or thread G is shown in cross-section in the measuring area M. The light source is not shown, however, a beam of parallel light is preferred for scanning the yarn.

To a sensor array 1 there is connected a series arrangement comprising a scanning device 2, a delay line 5, a logic circuit 6 forming the absolute value of the difference of its inputs, and a storage device consisting of a bidirectional pulse counter 7 and an AND-gate 8 controlling the pulse counter 7. Additionally, the measuring device comprises a clock or timer 3 and a cycle pulse generator 4 which together furnish clock and cycle pulses to scanning device 2 and delay line 5.

Array 1 comprises a line of e.g. 128 photosensors extending in transversal direction of the yarn G to be measured. Array 1 and scanning device 2 may be integrated in a structural unit or chip. Such integrated linear arrays comprising up to 1024 photodiodes, MOS switches and a shift register functioning as a scanning device are produced by the Reticon Corporation, Mountain View, Cal. U.S.A.

Scanning device 2 as well as delay line 5 may be arranged as shift registers comprising 128 storage cells.

Clock 3 and cycle pulse generator 4 determine the frequency of the clock pulses and the duration of the scanning cycles. In the present case, each scanning cycle comprises a start pulse, 128 clock pulses and a stop pulse. Within any scanning cycle all the sensors of array 1 are serially scanned, and the information stored in each of the shift registers 2 and 5 is passed to the serial output of the shift register as a series of pulses. The serial signals appearing at the output of the second shift register 5 are delayed by the interval of one cycle relative to the scanning signals appearing at the output of the first shift register 2.

Both output signals of the shift registers 2 and 5 are applied individually to one of the two inputs of the logic circuit 6 which produces a serial signal representing the absolute value of the difference of the shift register outputs. According to the embodiment shown in FIG. 1, the logic circuit 6 is arranged as an Exclusive-OR gate.

Counting or storage device 7,8 is designed such that counter 7 is set to forward counting only when AND-gate 8 furnishes a positive output, and set to backward counting in the other case.

Figure 2:
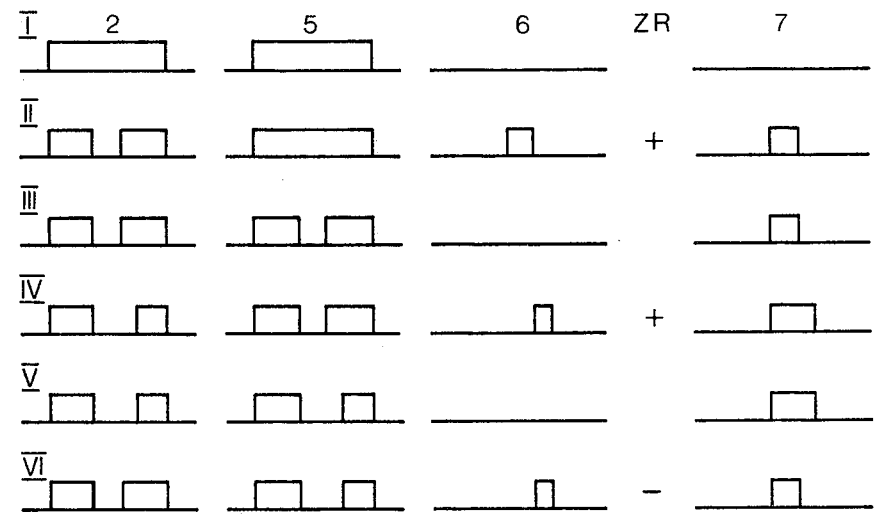
FIG. 2 is a pulse or signal graph illustrating the operation of the device shown in FIG. 1.

With reference to FIG. 2, in the lines I–IV there are shown the signal conditions at the outputs of the shift registers 2 and 5, logic circuit 6 and counter 7, respectively, within a scanning cycle, and further under ZR the respective counting direction. Each of the pulse series, briefly named signal, in the first and second columns under 2 and 5 represents the brightness distribution in the measuring area in the direction transverse to the yarn path. The output signals of the circuits 2, 5 and 6 and the pulses stored in counter 7 are simply plotted by the envelopes of the single coherent pulse trains, in view of the condensed time scale.

Line I shows the condition with the empty measuring area, i.e. when no yarn is present. The digital signals under 2 and 5 are of equal shape: the one-bit ONE signals indicate a bright zone in the middle of the measuring area, and the one-bit ZERO signals show dark zones at both edges of the measuring area. This corresponds with the assumption that the marginal zones of the measuring area are covered with dirt, and the intermediate middle zone of the measuring area is transparent or bright. Thus, a digital ZERO signal is present at the output of logic circuit 6 which signal represents the difference of the equal signals under 2 and 5. This means that the ground signal which is modified by dirt deposition in the empty measuring area is completely eliminated. The initial ZERO count in counter 7 is maintained.

Line II shows the signal condition immediately after insertion of a yarn in the measuring area. In the middle of the direct sensing signal under 2, there appears a ZERO signal or dark zone caused by the yarn. The digital signal under 5 stemming from the preceding scanning cycle corresponds to the empty measuring area. Under 6 there is shown the positive signal difference of the foregoing signals under 5 and 2 which signal difference represents the diameter of the yarn. The counting direction is positive or forward since the output signal of AND-gate 8 is positive simultaneously with the difference signal under 6. Thus, the latter is inserted in pulse counter 7 in forward direction.

In line III there are represented the digital signals occurring in the next cycle. The yarn scanning signal of line II, under 2 now appears delayed at the output of the second shift register 5, such that this delayed signal is identical with the undelayed output signal of the first shift register 2. Thus, the difference signal under 6 becomes ZERO, and pulse counter 7 remains unchanged.

Line IV shows the condition of the signals in the first cycle upon a yarn end of greater diameter entering the measuring area. There appears, under 2, a broader dark zone, while the unchanged scanning signal of the preceding cycle is present under 5. The difference of both signals under 6 is positive in the signal portion which corresponds to the enlarged yarn diameter, and simultaneously the output signal of AND-gate is positive. Thus, the positive pulses which indicate the increment of the diameter are counted in counter 7 in the positive direction, thus resulting in an indication of the new greater yarn diameter.

Line V again shows identity of the undelayed signal under 2 and delayed signal under 5. In this cycle, the thickened yarn end is still present in the measuring area. As with the signal condition in line III, the count in counter 7 is not changed now.

The next cycle is shown in line VI, where the scanning signal under 2 indicates that the yarn section in the measuring area has again accepted its original diameter as represented in lines II and III. Under 5, there still appears the signal indicative of the yarn thick place, and the absolute difference signal under 6—the difference of the signals 5 and 2 is negative—indicates the reduction of the diameter. Since the output of AND-gate 8 is ZERO, the single pulses in the signal under 6 representing the diameter reduction are backward counted in pulse counter 7, such that the latter again shows the original yarn diameter.

Figure 3:
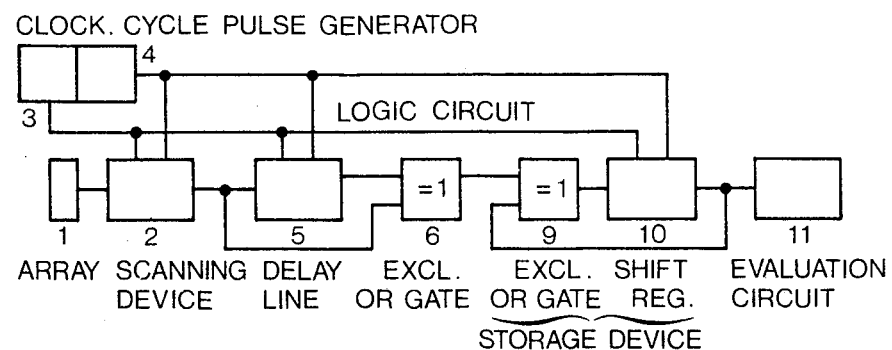
FIG. 3 shows a second embodiment of the inventive measuring device in block representation.

The measuring device shown in FIG. 3 comprises the same components or circuits 1 through 6 as the measuring device illustrated in FIG. 1. However, in place of counting device 7 connected to logic circuit 6 there is provided a series connection of a second logic circuit or Exclusive-OR gate 9, a third shift register 10 and an evaluation circuit 11. The one or first input of second Exclusive-OR gate 9 is connected to the output of the first Exclusive-OR gate 6, a second input with the output of third shift register 10. The latter has a signal input connected to the output of second Exclusive-OR gate 9, and two control inputs connected to the outputs of clock 3 and cycle pulse generator 4, respectively, such as to be controlled in synchronism with the first and second shift registers 2 and 5. Second Exclusive-OR gate 9 and third shift register 10 together form a storage device. The input of evaluation circuit 11 is connected to the output of third shift register 10. Storage device 9,10 has a somewhat similar function as counting device 7,8 of FIG. 1, however furnishes a serial output signal representative of the respective diameter of the yarn. In evaluation circuit 11, the digital output signal of third shift register 10 may be further processed in digital form, or alternatively transformed into an analog signal by a digital-analog converter, and further processed as such.

Delay line or shift register 5 may be alternatively arranged such that the delay thereof comprises several cycles.

According to the first embodiment illustrated by FIG. 1, the digital output signal of the differential logic circuit 6 is directly applied to a device continuously indicating the value of the yarn diameter in digital form. The measuring device according to FIG. 3 may be arranged as part of an electronic yarn clearer. In this case, the diameter signal furnished by storage device 9,10 may be transformed into an analog signal and processed as such by conventional yarn clearer technology, in order to detect and eliminate undesired thin and/or thick places in the yarn.

While there are shown and described present preferred embodiments of the invention, it is to be distinctly understood that the invention is not limited thereto but may be otherwise variously embodied and practiced within the scope of the following claims. ACCORDINGLY,

What I claim is:

1. A device for continuously measuring a transverse dimension of a traveling yarn-like structure, comprising:
   an array of optoelectrical sensors extending in a direction transverse to the traveling yarn-like structure;
   means for scanning sensors of the array in consecutive cycles for producing a digital scanning signal in serial form;
   means for delaying the digital scanning signal by an integer number $n \geq 1$ of cycles;
   logic means for producing a serial signal representative of the difference of the delayed and undelayed scanning signals;
   means for storing consecutive serial signals, for producing a signal representative of an instantaneous transverse dimension of the yarn-like structure; and
   the storing means being arranged as a counting device comprising a bidirectional counter, and an AND-gate having a first input connected to the output of the delaying means and a second input connected to the output of the logic means, the AND-gate having an output controlling the counting direction of the bidirectional counter.

2. A device for continuously measuring a transverse dimension of a traveling yarn-like structure, comprising:
   an array of optoelectrical sensors extending in a direction transverse to the traveling yarn-like structure;
   means for scanning sensors of the array in consecutive cycles for producing a digital scanning signal in serial form;
   means for delaying the digital scanning signal by an integer number $n \geq 1$ of cycles;
   logic means for producing a serial signal representative of the difference of the delayed and undelayed scanning signals;
   means for storing consecutive serial signals for producing a signal representative of an instantaneous transverse dimension of the yarn-like structure; and
   the storing means comprises a series connection of an Exclusive-OR gate and a shift register, the Exclusive-OR gate having a first input connected to an output of the logic means and a second input connected to an output of the shift register.

3. The device as defined in claim 1 or 2, wherein: the scanning means comprises a shift register.

4. The device as defined in claim 1 or 2, wherein: the delaying means comprises a shift register.

5. The device as claimed in claim 1 or 2, wherein: the logic means comprises an Exclusive-OR gate.

* * * * *